United States Patent
Chen et al.

(10) Patent No.: US 7,192,662 B2
(45) Date of Patent: Mar. 20, 2007

(54) ULTRA HIGH SATURATION MOMENT SOFT MAGNETIC THIN FILM

(75) Inventors: Chaopeng Chen, Fremont, CA (US); Kevin Lin, San Ramon, CA (US); Jei Wei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 175 days.

(21) Appl. No.: 10/909,529

(22) Filed: Aug. 2, 2004

(65) Prior Publication Data
US 2005/0000600 A1    Jan. 6, 2005

Related U.S. Application Data

(62) Division of application No. 09/859,363, filed on May 18, 2001, now Pat. No. 6,776,891.

(51) Int. Cl.
*G11B 5/33*    (2006.01)

(52) U.S. Cl. .................... 428/812; 148/312; 148/311

(58) Field of Classification Search ............. None
See application file for complete search history.

(56) References Cited

U.S. PATENT DOCUMENTS 6,120,918 A * 9/2000 Osaka et al. .............. 428/812
6,538,845 B1 * 3/2003 Watanabe et al. ........... 360/126

OTHER PUBLICATIONS

Bozorth, "Ferromagnetism", IEEE Press, 1993, pp. 190-209.*
Lowenheim, Frederick, Electroplating, 1978, pp. 426-429.*
"Atlas of Electrochemical Equilibria in Aqueous Solutions", by Marc Pourbaix, Trans. from the French by J.A. Franklin, Nat'l Assoc. of Corrosion Eng., Houston, TX, USA, CEBELCOR, Brussels, p. 2.
*Modern Electroplating*, Fourth Ed., Edited by Schlesinger et al., A Wiley-Interscience Publication, John Wiley & Sons Inc., NY, Ch. 13, pp. 555-583.

* cited by examiner

*Primary Examiner*—John P. Sheehan
(74) *Attorney, Agent, or Firm*—Saile Ackerman LLC; Stephen B. Ackerman

(57) ABSTRACT

A plated magnetic thin film of high saturation magnetization and low coercivity having the general form $Co_{100-a-b}Fe_aM_b$, where M can be Mo, Cr, W, Ni or Rh, which is suitable for use in magnetic recording heads that write on narrow trackwidth, high coercivity media. The plating method that produces the alloy includes four current application processes: direct current, pulsed current, pulse reversed current and conditioned pulse reversed current.

7 Claims, 7 Drawing Sheets

ULTRA HIGH SATURATION MOMENT SOFT MAGNETIC THIN FILM

This is a Divisional Application of U.S. patent application Ser. No. 09/859,363, filed on May 18, 2001, which has issued as U.S. Pat. No. 6,776,891 on Aug. 17, 2004, and which is assigned to a common assignee.

BACKGROUND OF THE INVENTION

1. Field of the Invention

This invention relates generally to the formation of magnetic films for use in fabricating recording heads suitable for writing on high density magnetic media. In particular the invention teaches a plating method for the formation of an alloy of novel composition and particularly advantageous magnetic properties.

2. Description of the Related Art

Magnetic write heads must be capable of recording on magnetic media with recording densities that will approach 100 Gb/in$^2$ by 2003. The high coercive force necessary to record on such media, coupled with the high resolution required by the narrow trackwidth and recording density, will necessitate the formation of write head material with high saturation magnetization and low coercivity. Since modern write head manufacturing techniques have turned to the thin film magnetic head as the structure of choice, a method must be found to form such thin films with a saturation magnetic moment preferably greater than 21 kG (kiloGauss) and low coercivity, preferably less than 13 Oe. Materials having these advantageous magnetic properties have already been studied extensively. Osaka et al. (U. S. Pat. No. 6,063,512) provide a magnetic film of low coercivity (a "soft" film) having a Co—Ni—Fe ternary alloy composition and trace amounts of S and formed by a method of constant current electrodeposition. The film so provided is reported to have a saturation magnetization, Bs, of between 1.5 T (Tesla) and 2.0 T (between 15 kG and 20 kG) and a coercivity of less than 50 Oe (Oersteds). Further, Osaka et al. (U.S. Pat. No. 6,120,918) provide a magnetic film of high magnetic moment and low coercivity having a Co—Fe—Ni ternary alloy composition with mixed BCC (body centered cubic) and FCC (face centered cubic) crystal structure. Said film has a saturation magnetization, Bs, of between 19 KG and 22 KG and a coercive force no greater than Hc=2.5 Oe. Although the soft film provided by Osaka has low coercivity, its saturation magnetization is marginal for the high density recording media envisioned. Other methods for forming magnetic films also suffer from the lack of sufficient magnetization. In this regard, Hasegawa (U. S. Pat. No. 6,124,047) provides a soft magnetic film of a Co-M-T-C composition with advantageous resistivity and magnetostriction properties but having saturation magnetization of approximately 14 kG (1.4T). Suzuki et al. (U. S. Pat. No. 5,935,403) provides a method for manufacturing a magnetic thin film in which colloidal particles of insulating material are suspended within a plating bath comprising Fe, Ni and Co ions. The thin film thereby formed is characterized by a saturation magnetization of between 1.5 T and 1.8 T, which is insufficient for the high density recording envisioned in the present invention.

Bozorth ("Ferromagnetism," R. M. Bozorth, IEEE Press, New York, N.Y. 1978, p. 190) describes an Fe$_2$Co alloy with a 24.3 kG maximum saturation moment. This alloy, however, is conventionally produced by bulk melting and high temperature thermal treatment, processes which are not suitable for magnetic write head formation. In addition, as noted by Yun, et al. ("Magnetic Properties of RF Diode Sputtered Co$_x$Fe$_{100-x}$ Alloy Thin Films," IEEE Trans. On Magnetics, 32(5), 9/1996, p 4535) this alloy also has an unacceptably high coercivity for application to write heads.

The particular method of electrodeposition applied to the formation of magnetic films also plays a role in achieving their advantageous properties. In this respect, Asai et al. (U.S. Pat. No. 5,489,488) teach an electroplating process to form a soft magnetic multilayer film whose successive layers are formed by alternating the current direction within the electrolyte. Liao et al. (U.S. Pat. No. 4,756,816) teach an electroplating method using a low toxicity bath in which sodium saccharin acts as a stress relieving agent, boric acid acts as a pH buffer and dodecyl sodium sulfate acts as a surfactant to eliminate pitting.

An effective method to reduce film coercivity is by promoting grain refinement (smaller grain sizes). Grain refinement is generally achieved by enhancing nucleation or impeding grain growth during electrodeposition. As-deposited materials of mixed structure generally have smaller grain sizes because competition between structures promotes nucleation which, in turn, leads to more, but smaller, grains. The mixed FCC and BCC crystals of Co—Fe—Ni disclosed by Osaka et al. above is an example of the use of multiple structures to reduce grain growth. Multiple, coexisting structures can also be formed by the addition of minor amounts of elements such as Mo, Cr, W and Rh. FIG. 1 shows a phase diagram for a Co—Fe—Mo in which the Mo is present in approximately 5% by atomic weight. As can be seen, this small amount of Mo produces α, γ, and θ structures.

Another approach for reducing grain size is incorporating materials through use of a dispersed metal oxide. The oxide interrupts grain growth and thus enhances nucleation during electrodeposition. Oxides of Mo, W, Cr and Rh can be deposited from an aqueous solution under an anodic potential. FIG. 2 shows that MoO$_3$ can be deposited from an aqueous solution containing M$_{+++}$ ions at anodic potential greater than 0.2V and a pH less than 4. FIG. 2 also shows that that Mo can be oxidized to MoO$_2$ at a slightly cathodic potential. The MoO$_2$ can then be further oxidized to MoO$_3$ at an anodic potential in an acidic environment.

Electroplating is an effective method for producing thin film magnetic alloys. Co, Fe, Ni, Mo, Cr, W and Rh can be readily co-deposited from an aqueous solution of their salts by use of a cathodic current. The alloy content can be adjusted by the solution concentration and current density. The more concentrated element in the solution generally produces the more concentrated element in the alloy. Higher current density favors the reduction of the element with the higher reduction potential.

Adjusting plating parameters can fine tune some of the mechanical and magnetic properties of the alloy film. For example, the addition of saccharin is known to reduce stress within the film (see Liao et al., cited above.) Pulse and pulse reversal plating provides two potential advantages over direct current plating. One such advantage is the reduction of grain size by grain growth interruption with corresponding lowering of coercivity. Another advantage is improved micro-uniformity. The anodic period of the current allows the metal ion to be replenished, producing a uniformity of metal concentration across the topography of the film. This is particularly advantageous in plating applications wherein the film is to be deposited in trenches with high aspect ratios, such as is the case when plating upper pole pieces of magnetic write head elements.

SUMMARY OF THE INVENTION

A first object of this invention is to provide a method for forming a thin film magnetic alloy having a high saturation magnetic moment and low coercivity.

A second object of this invention is to provide a method for forming a thin film magnetic alloy having a high saturation magnetic moment and low coercivity, wherein said film can be formed within trenches having high aspect ratio.

A third object of this invention is to provide a method for forming a thin film magnetic alloy having a high saturation magnetic moment and low coercivity wherein said film is suitable for use in the fabrication of magnetic write heads for high density magnetic recording media.

In accord with the objects of this invention there is provided an alloy of Co—Fe—M, wherein the element M can be chosen from the group consisting of Mo, Cr, W, Ni or Rh and wherein said alloy has a composition of the form $Co_{100-a-b}Fe_aM_b$, wherein a is between 50 and 80 and b is between 0 and 10 and wherein the as-deposited saturation magnetic moment is greater than 20 kG and the easy-axis coercivity is less than 7 Oe.

Further in accord with the objects of this invention there is provided a method of forming said alloy of the form $Co_{100-a-b}Fe_aM_b$, wherein a is between 50 and 80 and b is between 0 and 10, by an electroplating process using direct current, pulse, pulse reversal and conditioned pulse reversal and wherein said electroplating method is suitable for forming thin films of said alloy within trenches having high aspect ratios such as is the case in upper pole pieces of magnetic write head elements.

Further in accord with the objects of this invention is the application of pulse reversal and conditioned pulse reversal to the plating process, wherein there is an advantageous reduction of grain size by grain growth interruption with corresponding lowering of coercivity of the as-plated film.

Still further in accord with the objects of this invention is the application of pulse reversal and conditioned pulse reversal to the plating process wherein there is obtained an advantageous improvement of alloy micro-uniformity as the anode period of the current allows the metal ion to be replenished, producing a uniformity of metal concentration across the topography of the film.

Also in accord with the objects of this invention there is provided an alloy within the composition range $Co_{100-a-b}Fe_aM_b$, wherein a is between 57 and 64 and wherein b is between 1.5 and 3, and wherein said alloy has an as-deposited saturation magnetization moment greater than 21 kG and an easy-axis coercivity of less than 7 Oe.

Still further in accord with the objects of this invention there is provided a pulse reversal and conditioned pulse reversal electroplating method for formation of the $Co_{100-a-b}Fe_aM_b$ alloy wherein a is between 57 and 64 and b is between 1.5 and 3 and wherein said electroplating method is suitable for forming thin films of said alloy within trenches having high aspect ratios.

Yet further in accord with the objects of this invention there is provided a particular example of the $Co_{100-a-b}Fe_aM_b$ alloy wherein a is between 63 and 67 and b is between 0 and 0.5 and wherein the as-deposited saturation magnetic moment of said alloy is greater than 23 kG and its easy-axis coercivity is less than 11 Oe.

Still further in accord with the objects of this invention there is provided a direct current, pulse, pulse reversal and conditioned pulse reversal electroplating method for formation of the $Co_{100-a-b}Fe_aM_b$ alloy wherein a is between 63 and 67 and b is between 0 and 0.5 and wherein said electroplating method is suitable for forming thin films of said alloy within trenches having high aspect ratios.

Yet further in accord with the objects of this invention there is provided an electroplating method for the formation of four element film, a particular example being $CoFe_{67}Ni_2Mo_3$, which is formed by a pulse reversal method.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein.

DESCRIPTION OF THE PREFERRED EMBODIMENT

The present invention is a method for forming a thin Co—Fe—M alloy plated magnetic film, which, as-deposited, has a saturation magnetization of up to 24 kG and a minimum easy-axis coercivity of 6 Oe. Element M can be chosen from the group consisting of Mo, Ni, W, Cr or Rh. The alloy has the general composition $Co_{100-a-b}Fe_aM_b$, wherein, for optimality of the magnetic characteristics, the Co/Fe weight ratio ranges from 50/50 to 20/80. Element M appears in the alloy at less than 10% by weight. The alloy contains trace amounts of oxides of element M, such as $MoO_{2-3}$, $CrO_{1-5}$, $RhO_{0.5-2}$, $NiO_{1.33-2}$ or $WO_{2-3}$. The alloy is plated from a plating solution consisting of (a) cobalt sulfate or chloride salt; (b) ferrous sulfate or chloride salt; (c) supporting salt of sodium, potassium or ammonium chloride, sulfate, acetate, citrate, tartrate, or sulfamate; (d) pH buffering agent such as boric acid; (e) stress reducing agent such as sodium saccharin; (f) surfactant such as sodium lauryl sulfate, and (g) additional metal salt such as sodium or ammonium molybdenate to provide element M. An acidic plating environment is preferred in this application. The plating can be performed with direct current, pulse, pulse reversal or conditioned pulse reversal.

Referring now to FIG. 3, there is shown a graphical representation of current vs. time waveforms for the various plating processes provided by the present invention. FIG. 3(a) is a schematic depiction of a direct cathodic current. FIG. 3(b) is a schematic depiction of a pulsed cathodic current, wherein the pulse width is indicated as "a" and the spacing between pulses is "b." FIG. 3(c) is a schematic depiction of a pulsed reversal current, wherein each cathodic pulse of width "a" is followed by an anodic pulse of width "b." FIG. 3(d) is a schematic representation of a conditioned pulse reversal current wherein the cathodic pulse is "conditioned" by a stepped reduction (or increase) of pulse height of width "c" and the anodic current is conditioned by a stepped increase in pulse height of width "d."

Figure 1:
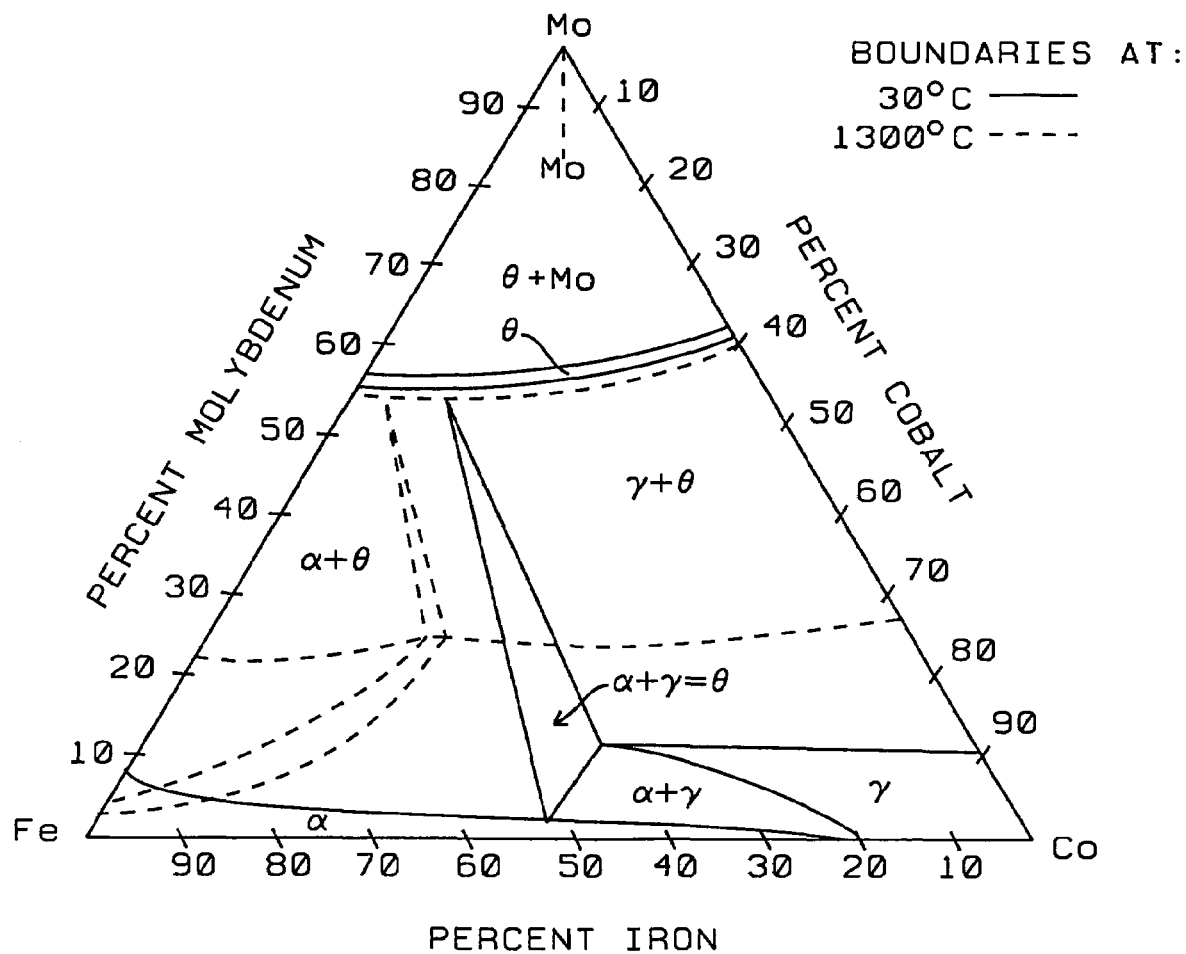
FIG. 1 is a CoFeMo equilibrium phase diagram at 20° C. and 1300° C.
Figure 2:
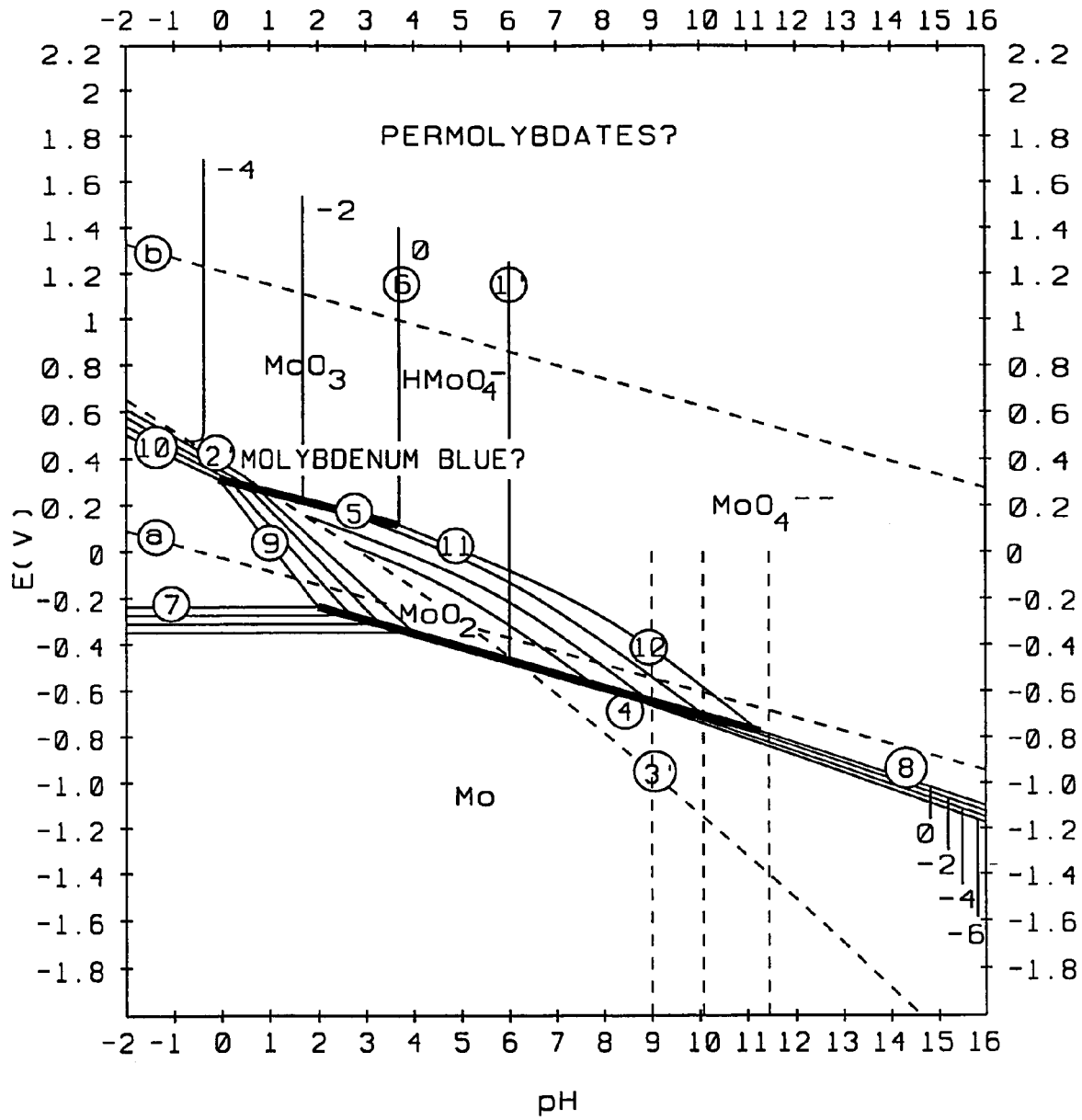
FIG. 2 is an electrochemical equilibrium diagram for Molybdenum in aqueous solution.
Figure 3A:
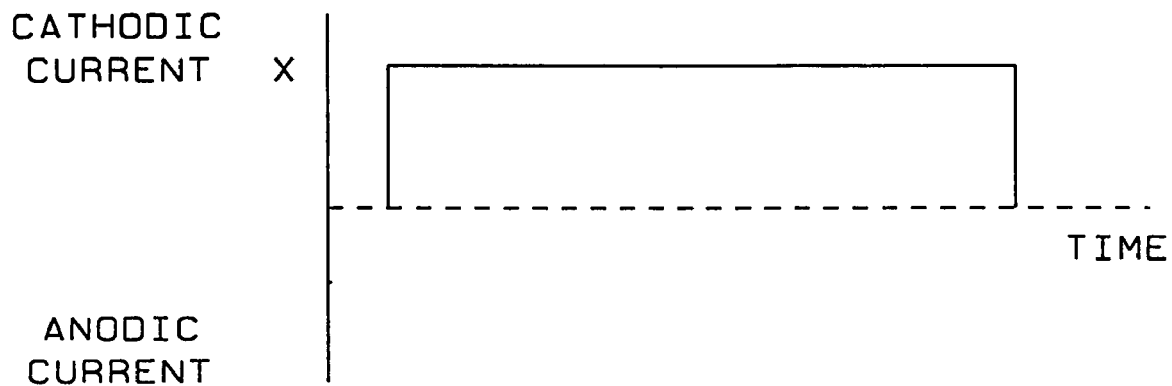
FIG. 3 contains four graphical representations of anodic and cathodic current plotted against time for different modes of plating provided by the present invention.
Figure 3B:
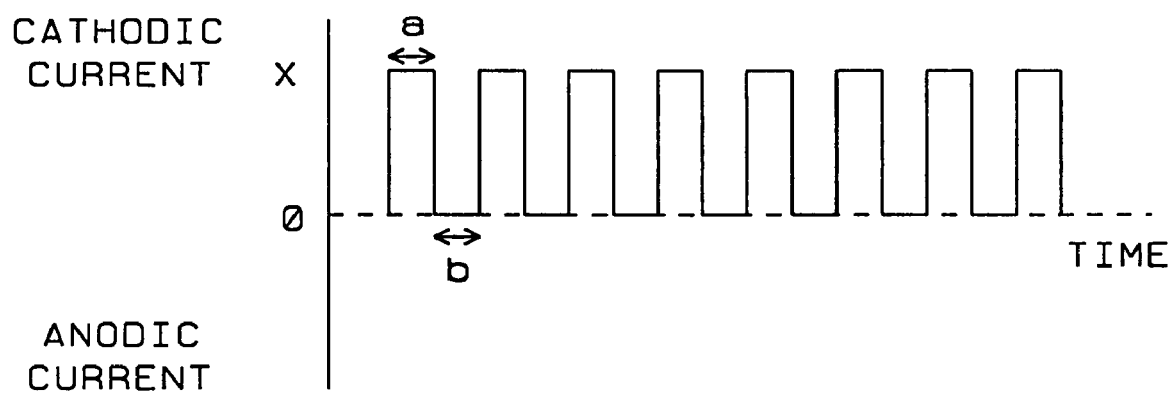
Figure 3C:
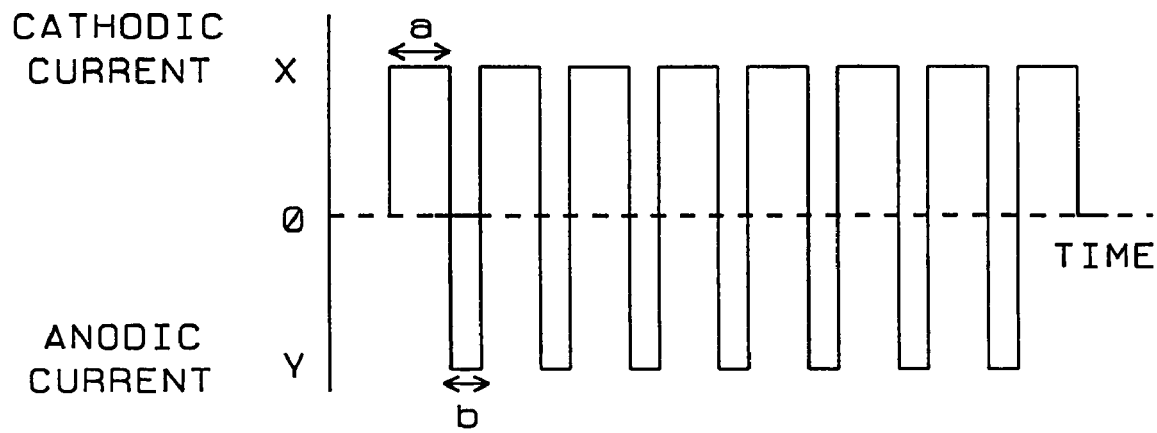
Figure 3D:
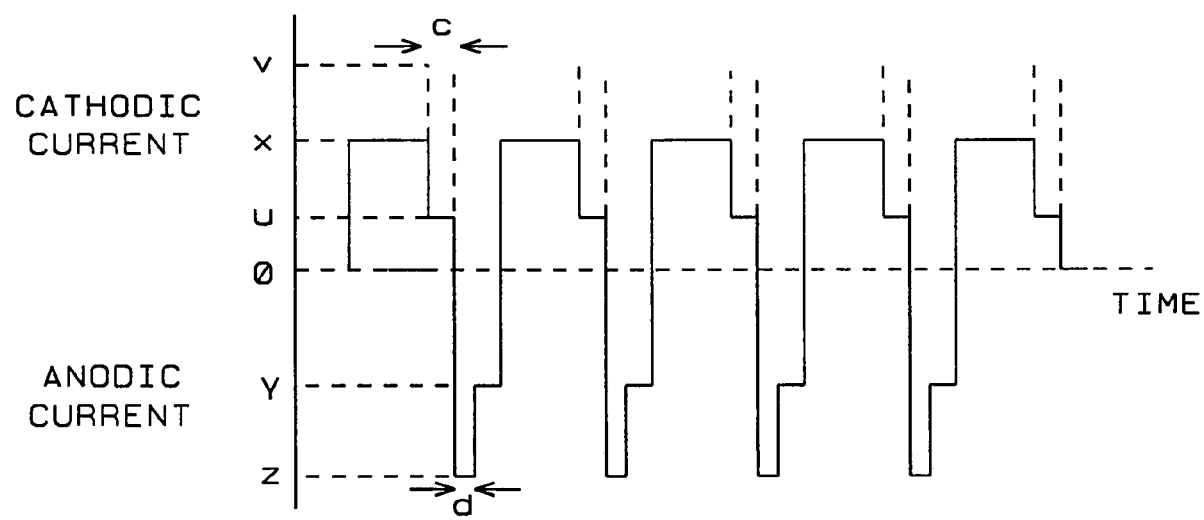

Direct current plating produces minimal oxide formation in Co—Fe—M and Co—Fe alloys. Pulse plating shown in FIG. 3(b) deposits Co—Fe—M alloy during cathodic current (current value "x" in figure) and oxidizes element M when said current is reduced to zero. Pulse reversal plating shown in FIG. 3(c) is similar to pulse plating except that the brief anodic current-pulses of magnitude "y" enhances the oxidation of element M. The conditioned cathodic pulse shown in FIG. 3(d), of step height "u" or "v" increases the content of element M in the alloy. The conditioned anodic pulse of height "z" shown on the same graph favors oxide formation. The magnitude of the cathodic pulse height depends on the reduction potential of element M. For elements with low reduction potential such as Ni, Mo and Rh, a conditioning current "u" that is less than "x" is favored. For W and Cr, whose reduction potential is higher than the Co—Fe system, a higher current "v" is preferred. Table 1, below, summarizes the working range of current densities for Co—Fe—M plating in accord with the objects of this invention.

TABLE 1

Working range of current density for direct current, pulse, pulse reversal and conditional pulse reversal Co—Fe-M plating.

| Notation | Significance | Working Range |
|---|---|---|
| x | Cathodic current | 5–30 mA/cm$^2$ |
| y | Anodic current | 0–30 mA/cm$^2$ |
| u | Cathodic conditioning current | 1–x mA/cm$^2$ |
| v | Cathodic conditioning current | x–60 mA/cm$^2$ |
| z | Anodic conditioning current | y–50 mA/cm$^2$ |
| a | Cathodic pulse duration | 10 ms–10 s |
| b | Anodic pulse duration | 1 ms–1 s |
| c | Cathodic pulse conditioning duration | 1 ms–9000 ms |
| d | Anodic pulse conditioning duration | 1 ms–100 ms |

The following two examples are disclosed as actual applications of the method of the present invention as set forth within the description of the preferred embodiment herein.

EXAMPLE 1.

A high magnetic moment Co—Fe—Mo alloy with MoO$_x$ is prepared by pulse reversal plating using solutions with the chemical concentrations set forth in Table 2 below and plating parameters set forth in Table 3 below. The plating is performed in a paddle cell with a magnetic field of 1 kG. The substrate is 4.5"×4.5" AlTiC with an Al$_2$O$_3$ undercoat and NiFe, CoNiFe, Cu, or Au sputtered underlayer. The thickness of said underlayer is between 0.07 μm (microns) and 0.1 μm. The plated film thickness is controlled to be within the range of 0.7 μm and 1.3 μm.

TABLE 2

Co—Fe—Mo alloy plating solution.

| Component | Concentration (g/l) |
|---|---|
| CoSO$_4$7H$_2$O | 15–30 |
| FeSO$_4$7H$_2$O | 8–50 |
| NH$_4$Cl | 12–20 |
| H$_3$BO$_3$ | 20–35 |
| Na$_2$MoO$_4$2H$_2$O | 0–0.5 |
| C$_7$H$_5$NO$_3$S | 0.5 |
| C$_{12}$H$_{25}$NaO$_4$S | 0.1 |
| pH | 2–4 |

TABLE 3

Typical plating parameters for Co—Fe—Mo alloy.

| Operating Parameters | Notation | Amount |
|---|---|---|
| Cathodic current density | x | 15 mA/cm$^2$ |
| Anodic current density | y | 15 mA/cm$^2$ |
| Cathodic duration | a | 1 s |
| Anodic duration | b | 10 ms |
| Paddle speed | | 1 Hz |

Figure 4:
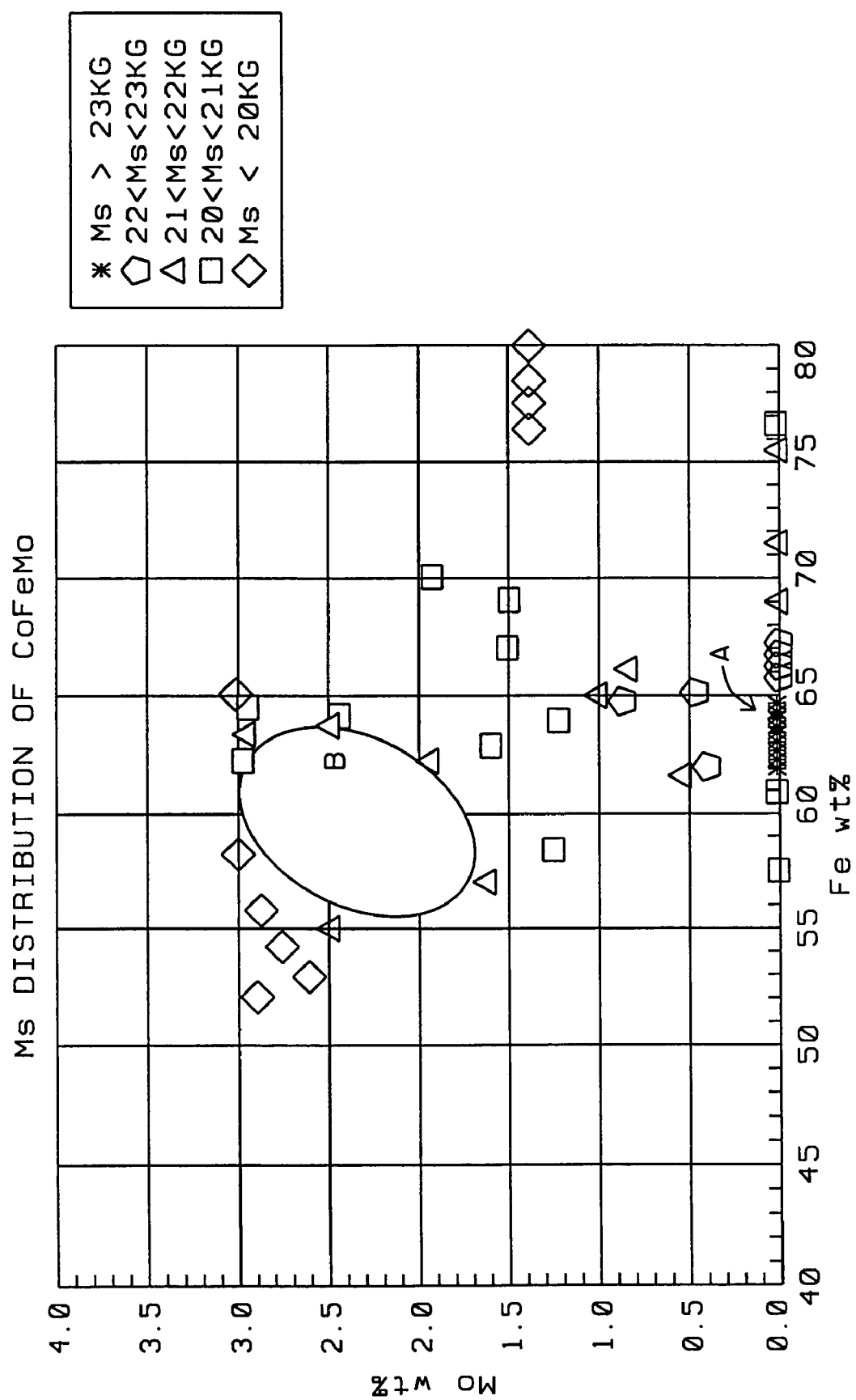
FIG. 4 is a graphical representation of the as-deposited saturation magnetization of plated CoFeMo alloy.

The plating process characterized by the chemical concentrations and physical parameters in Table 2 and Table 3 respectively produces plated materials having high saturation moments. Referring to FIG. 4, there is seen a plot of plated film saturation moments over a wide range of weight percentages of Co and Mo. Trace amounts of molybdenum oxide is formed during the anodic period. A wide range of materials in FIG. 4, consisting of alloys which are 55%–76% Fe by weight and greater than 0% Mo by weight, exhibit a saturation moment that is greater than 20 kG. Within this range two local maxima were found, indicated as "A" and "B" on the graph, wherein the saturation moment exceeded 23 kG. The composition of the alloy within the "A" range consists of 63%–66.5% Fe by weight and less than 0.2% Mo by weight. The highest saturation moment found is 24 kG. The material composition corresponding to this value is CoFe$_{64.5}$. Area B on the graph shows another local maximum wherein the saturation moment is greater than 21 kG and wherein the alloy composition is 58%–64% Fe by weight and 1.5%–3% Mo by weight. The highest saturation moment found within this region corresponds to an alloy composition CoFe$_{62.5}$Mo$_{2.4}$.

Figure 5:
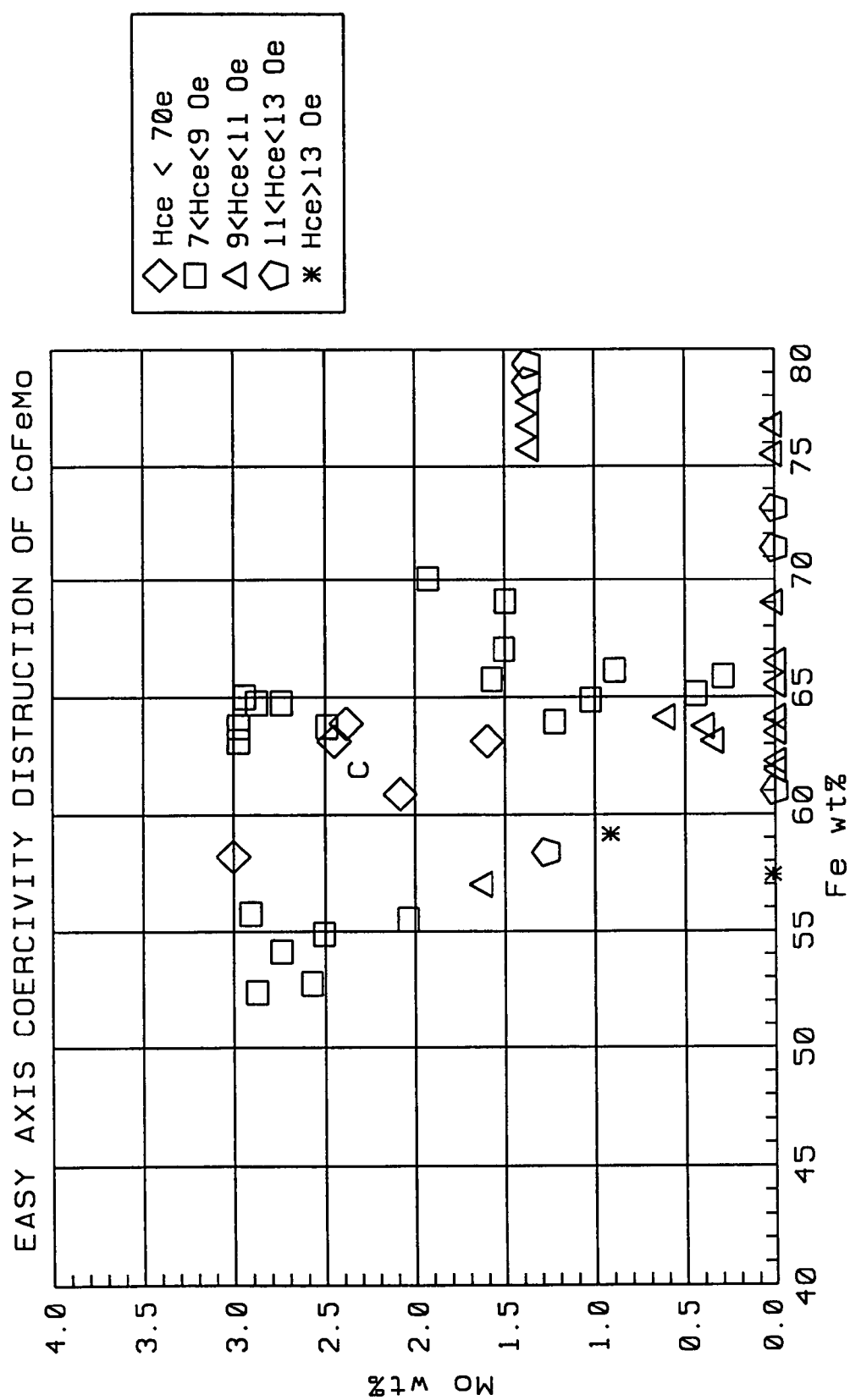
FIG. 5 is a graphical representation of the as deposited easy-axis coercive force of of plated CoFeMo alloy within the same compositional ranges as specified in FIG. 4.

Referring next to FIG. 5, there is shown the as-plated easy-axis coercivity of Co—Fe—Mo. Alloy composition within the range 58%–65% Fe by weight and greater than 1.6% Mo by weight exhibits as-deposited Hce that is less than 7 Oe. The lowest coercivity found is 6 Oe at an alloy composition CoFe$_{62.5}$Mo$_{2.4}$, which is labeled C in the graph. Within measurement tolerances, the alloy composition in C of FIG. 5, which is minimum coercivity, overlaps the alloy composition in B of FIG. 4, which is maximum saturation moment. Combining the findings of these two figures, two alloy compositions can be found that possess good magnetic properties meeting the objectives of this invention. For an application that requires a maximum saturation moment, CoFe$_{63-66.5}$Mo$_{<0.2}$ offers Ms>23 kG and Hce approximately 10 Oe. For an application requiring balanced switching speed and saturation moment, CoFe$_{58-64}$Mo$_{1.7-2.9}$ with Ms>21 kG and Hce<7 Oe is the alloy material of choice.

Figure 6:
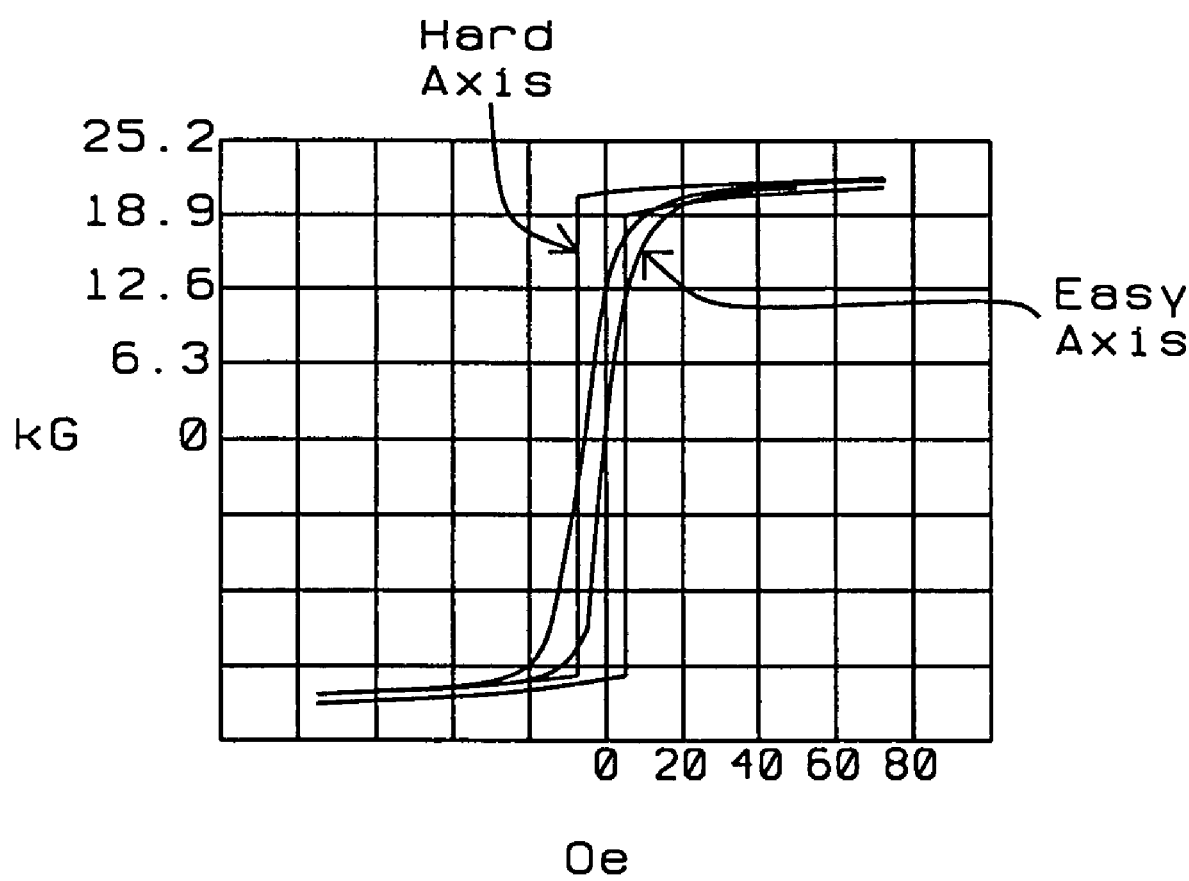
FIG. 6 is a graphical representation of B vs H loop traces (hysteresis curves) for the easy and hard axes of a particular as-deposited CoFeMo film.

Referring now to FIG. 6, there is shown a typical B—H loop trace of as-plated CoFe$_{62.5}$Mo$_{2.4}$ showing a saturation moment of approximately 22 kG and an easy-axis coercivity of approximately 5.9 Oe.

EXAMPLE 2.

Pulse reversal plating improves the as-plated coercivity. This example shows the advantage of pulse reversal over direct current plating. The plating is performed under conditions similar to those given in Example 1, except that samples #5 and #6 are plated in a solution containing an additional 10 g/l of NiSO$_4$ 6H$_2$O. The as-deposited coercivities are given in Table 4, below.

TABLE 4

Effects of additional elements and pulse reversal on as-plated, easy-axis coercivity.

| | Sample# | | | | | |
|---|---|---|---|---|---|---|
| | 1 | 2 | 3 | 4 | 5 | 6 |
| Composition | CoFe$_{65}$ | CoFe$_{65}$ | CoFe$_{65}$Mo$_{0.4}$ | CoFe$_{65}$Mo$_{0.4}$ | CoFe$_{67}$Ni$_2$Mo$_3$ | CoFe$_{67}$Ni$_2$Mo$_3$ |
| Process | DC | PR | DC | PR | DC | PR |
| Hce(Oe) | 11 | 9 | 11 | 8 | 9 | 8 |

Pulse reversal (PR) plating results in reduction of as-deposited coercivity (Hce) over direct current (DC) plating. This could be a result of interrupted grain growth. The effectiveness of PR is more pronounced when when Mo is co-deposited with the Co—Fe alloy (samples #3–6). This may be a result of a co-deposition of MoO$_{2-3}$ causing a further reduction in Hce. A similar effect was found in the Co—Fe—Ni—Mo system.

As is understood by a person skilled in the art, the preferred embodiment of the present invention is illustrative of the present invention rather than limiting of the present invention. Revisions and modifications may be made to methods and materials employed in forming a thin Co—Fe—M alloy plated magnetic film of general form Co$_{100-a-b}$Fe$_a$M$_b$ having a high saturation moment and low coercivity, while still providing a method for forming such a thin Co—Fe—M alloy plated magnetic film of general form Co$_{100-a-b}$Fe$_a$M$_b$ having a high saturation moment and low coercivity in accord with the spirit and scope of the present invention as defined by the appended claims.

What is claimed is:

1. A plated magnetic pole structure for a magnetic write head capable of writing on high coercivity magnetic media at narrow trackwidths and at area densities exceeding 100 GB/in$^2$ comprising:

a substrate;

a plated magnetic pole structure formed on said substrate, said pole structure being formed of a plated thin film Co—Fe—M alloy of saturation magnetization greater than 20 kG and easy-axis coercivity less than 13 Oe, having the general compositional form Co$_{100-a-b}$Fe$_a$M$_b$ wherein a is between 50 and 80, b is between 0 and 10 and M is an element selected from the group consisting of Mo, Cr, W, Ni and Rh.

2. A plated magnetic pole structure for a magnetic write head capable of writing on high coercivity magnetic media at narrow trackwidths and at area densities exceeding 100 GB/in$^2$ comprising:

a substrate;

a plated magnetic pole structure formed on said substrate, said pole structure being formed of a plated thin film Co—Fe—M alloy of saturation magnetization greater than 21 kG and easy-axis coercivity less than 7 Oe, having the compositional form Co$_{100-a-b}$Fe$_a$M$_b$ wherein a is between 57 and 74, b is between 1.5 and 3 and M is an element selected from the group consisting of Mo, Cr, W, Ni and Rh.

3. A plated magnetic pole structure for a magnetic write head capable of writing on high coercivity magnetic media at narrow trackwidths and at area densities exceeding 100 GB/in$^2$ comprising:

a substrate;

a plated magnetic pole structure formed on said substrate, said pole structure being formed of a plated thin film Co—Fe—M alloy of saturation magnetization greater than 23 kG and easy-axis coercivity less than 11 Oe, having the compositional form Co$_{100-a-b}$Fe$_a$M$_b$ wherein a is between 63 and 67, b is between 0 and 0.5 and M is an element selected from the group consisting of Mo, Cr, W, Ni and Rh.

4. The plated magnetic pole structure of claim 1 where, in addition, there are contained trace amounts of oxides of element M in said Co—Fe—M alloy.

5. The plated magnetic pole structure of claim 2 where, in addition, there are contained trace amounts of oxides of element M in said Co—Fe—M alloy.

6. The plated magnetic pole structure of claim 3 where, in addition, there are contained trace amounts of oxides of element M in said Co—Fe—M alloy.

7. A plated magnetic pole structure for a magnetic write head capable of writing on high coercivity magnetic media at narrow trackwidths and at area densities exceeding 100 GB/in$^2$ comprising:

a substrate;

a plated magnetic pole structure formed on said substrate, said pole structure being formed of a plated thin film four component alloy of the general form Co—Fe—Ni—Mo and a particular form CoFe$_{67}$Ni$_2$Mo$_3$.

* * * * *